July 27, 1965 J. MORRIS 3,197,643

ELECTRO-OPTICAL PLANE ALIGNING APPARATUS

Filed Dec. 30, 1960 2 Sheets-Sheet 1

INVENTOR

JOHN MORRIS

BY Bernard N. Wiener

ATTORNEY

July 27, 1965 J. MORRIS 3,197,643

ELECTRO-OPTICAL PLANE ALIGNING APPARATUS

Filed Dec. 30, 1960 2 Sheets-Sheet 2

United States Patent Office 3,197,643
Patented July 27, 1965

3,197,643

ELECTRO-OPTICAL PLANE ALIGNING APPARATUS

John Morris, Nichols, N.Y., assignor to International Business Machines Corporation, New York, N.Y., a corporation of New York Filed Dec. 30, 1960, Ser. No. 79,725
2 Claims. (Cl. 250—210)

This invention relates to plane aligning apparatus and more particularly to an electro-optical plane aligning apparatus which includes an optical collimator structure and a light sensitive bridge network optically coupled thereto.

Generally, a physical object is located spatially if a work plane fixedly associated therewith is aligned relative to a reference frame. A work plane is aligned relative to a reference frame by three linear coordinates and three angular orientations, commonly termed pitch, azimuth and roll. Its angular relationship relative to a reference plane fixedly associated with the reference frame is established by its pitch and azimuth.

A prior art apparatus for aligning a work plane relative to a reference plane has included an optical collimator structure having optical read-out. Illustrative of such prior art apparatus is the optical angle setting and aligning device presented by U.S. Patent No. 2,775,158. The collimator structure thereof is fixedly mounted on the reference plane and the pitch and azimuth of the work plane are visually discerned by observation of a crosshair image projected onto a graduated reticle fixedly associated with the collimator. The image is obtained by projection of light via a beam splitter and lens system to the work plane and its reflection therefrom via the beam splitter to the reticle as optical read-out.

The sensitivity of read-out of such prior art devices is a function of the selected optical leverage. The optical leverage is determined by the focal length of the projection lens. Since the observer is a fixed parameter in such a system, the collimator structure must be larger to accommodate the increased focal length required for increased sensitivity. Often, the requisite size is incompatible with the practical usage of the collimator.

Further, such a prior art device is not practical for automating the alignment of the work plane since an observer is not normally suitable as a part of the requisite system.

A first object of this invention is to provide apparatus for aligning a work plane relative to a reference frame.

It is a second object of this invention to provide apparatus for aligning a work plane relative to a reference plane.

It is a third object of this invention to provide apparatus for establishing the pitch and azimuth of a work plane relative to a reference plane, said apparatus having an optical collimator structure and a light sensitive bridge network optically coupled thereto.

It is a fourth object of this invention to provide apparatus for aligning a work plane relative to a reference plane which continuously provides electrical information concerning the pitch and azimuth of the work plane.

It is a fifth object of this invention to provide electro-optical apparatus for aligning a work plane relative to a reference plane suitable for automating the alignment.

It is a sixth object of this invention to provide electro-optical plane aligning apparatus having small size commensurate with great accuracy.

The foregoing and other objects, features and advantages of the invention will be apparent from the following more particular description of a preferred embodiment of the invention, as illustrated in the accompanying drawings.

Figure 5:
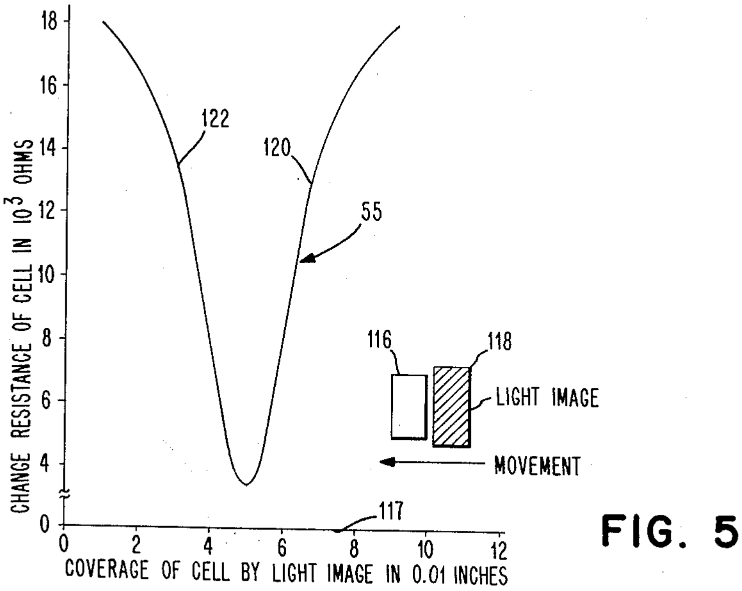

FIGURE 5 presents the results of an illustrative experiment for determining the variation of the resistance of a particular photo-conductive cell with relative coverage thereof by projected light.

Broadly, this invention provides an electro-optical plane aligning apparatus having an optical collimator section and a light sensitive electrical bridge section optically coupled thereto for providing electrical information concerning the pitch and azimuth of a work plane relative to a reference plane. More specifically, the collimator structure includes a light source, an aperture, and an optical system for providing an image of the aperture on a photo-conductive-cell array. The photo-conductive cell array is a part of a light sensitive bridge network. Information concerning the angular orientation of the work plane relative to the reference plane is electrically discerned by the network which responds to the position of the image on the array. In a particular embodiment, the optical section has a beam splitter and a collimator lens system whereby light associated with the aperture is transmitted via the beam splitter and lens system to the work plane and reflected therefrom via the beam splitter to the photo-conductive cell array of the bridge network as a light image of the aperture.

Figures 1, 2, 3:
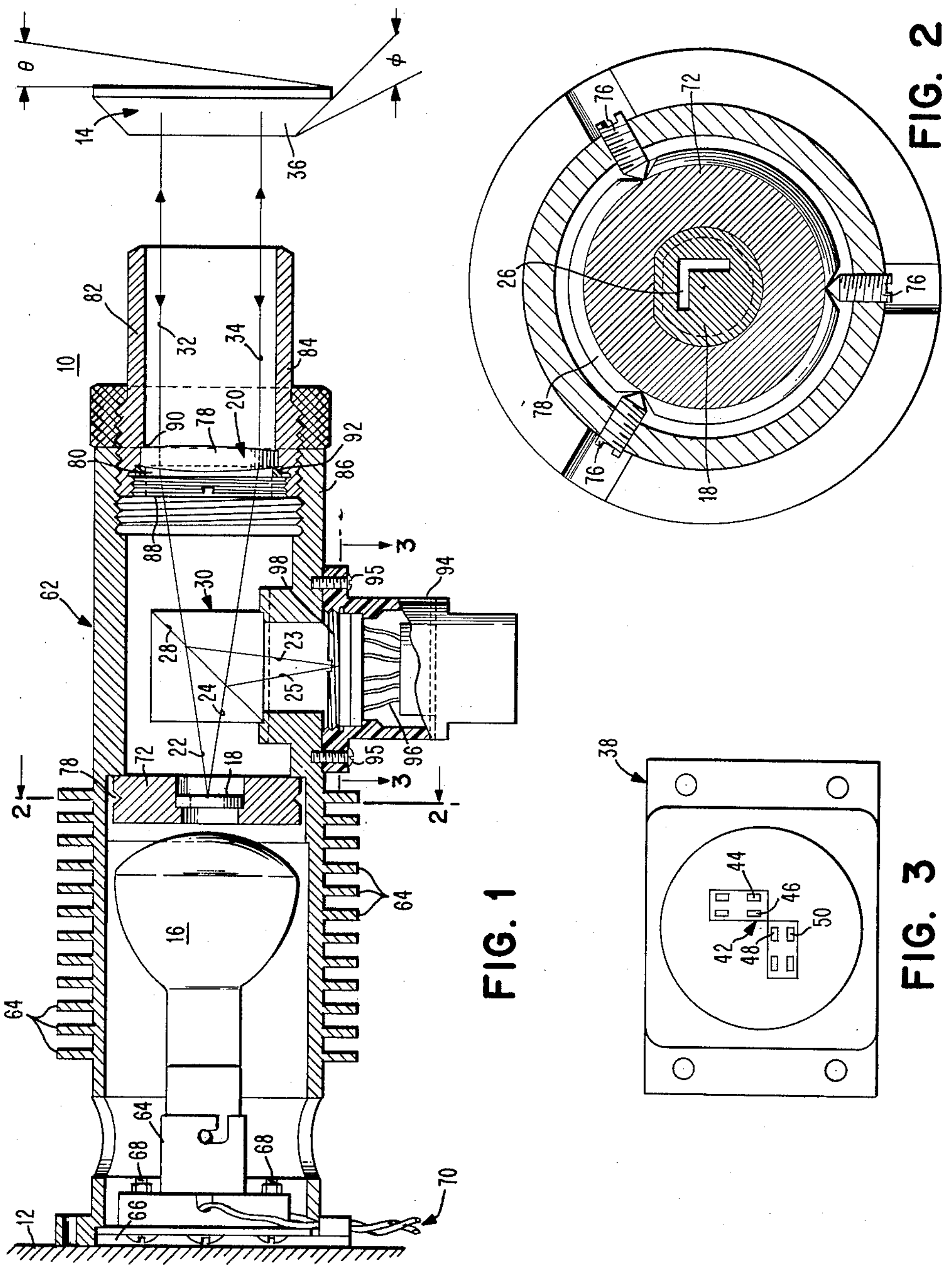
FIGURE 1 is a sectional view of apparatus constructed in accordance with this invention illustrating both the apparatus and the pitch and azimuth of a work plane relative to a reference plane.
FIGURE 2 is an enlarged cross-section of FIG. 1 taken on the line 2—2 showing the image aperture structure and manner in which it is mounted in the electro-optical apparatus.
FIGURE 3 is a top view taken on the line 3—3 of FIG. 1 illustrating the photo-conductive cell portion of the light sensitive bridge network.
Figure 4:
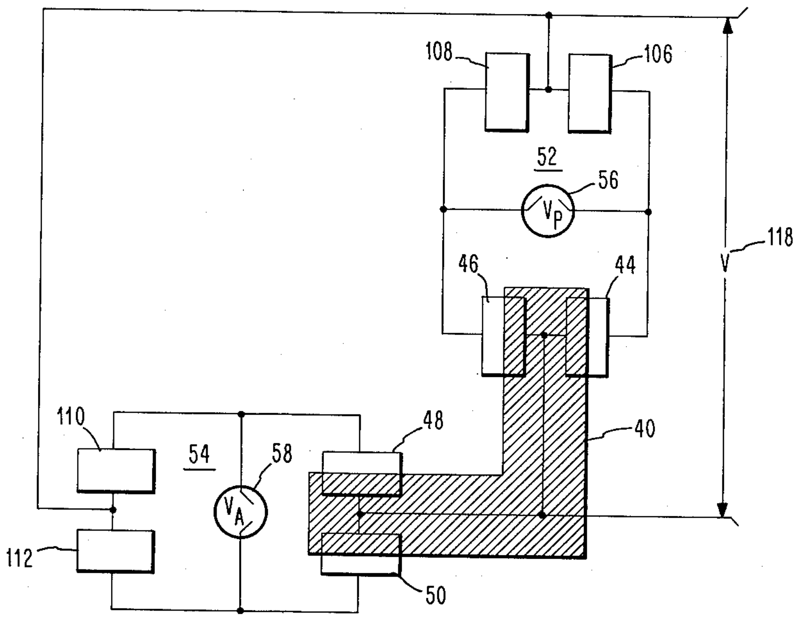
FIGURE 4 is a schematic diagram of the bridge network for providing electrical information concerning the pitch and azimuth of the work plane relative to the reference plane showing the photo-conductive cells and the projected light pattern of the aperture.

In FIG. 1 there is shown an electro-optical apparatus 10 suitable for the practice of this invention. It is fixedly associated with reference plane 12. The purpose of electro-optical apparatus 10 is to provide electrical information concerning the pitch angular orientation $\theta$ and azimuth orientation $\phi$ of work plane 14 relative to reference plane 12. Light source 16 illuminates aperture plate 18 which is located in the focal plane of collimator lens structure 20. Illustrative light rays 22 and 24 are projected from aperture 26 (FIG. 2) via beam splitter plane 28 of beam splitter 30 to collimator lens system 20. Lens system 20 collimates light rays 22 and 24 to corresponding collimated light rays 32 and 34 which are reflected from mirror face 36 of work plane 14. Light rays 32 and 34 pass via collimator lens system 20 to photo-conductive cell array plane 38 (FIG. 3) located in the focal plane of lens system 20. Image 40 (FIG. 4) of aperture 26 is thus projected onto photo-conductive cell array 42 (FIGS. 3 and 4). The resistances of photo-conductive cells 44 and 46 and photo-conductive cells 48 and 50 of bridge networks 52 and 54, respectively, are altered according to the amount of aperture image 40 thereon. The change of resistance versus light coverage characteristic of each cell is illustrated by the curve 55 of FIG. 5. The voltage output 56 of bridge network 52 is a measure of the pitch of work plane 14 and the output voltage 58 of bridge network 54 is a measure of the azimuth thereof.

In greater detail, the electro-optical apparatus 10 illustrated by FIG. 1 includes a housing 62 fixedly associated with reference plane 12. Housing 62 has a plurality of peripheral fins 64 for cooling. Lamp light source 16 is mounted at the left end of housing 62 within socket 64 which is secured to base 66 by bolts 68. Conductors 70 are used to energize lamp 16.

Aperture plate 18 is mounted within housing 62 by aperture frame 72. Aperture frame 72 is movably mounted within housing 62 by set screws 76 spaced at 120° intervals around the periphery of housing 62. Set screws 76 press into aperture frame 72 in groove 78 therein. Through the manner of mounting of aperture frame 72 described, it is possible to adjust the location of aperture 26 for calibration of the electro-optical apparatus in accordance with this invention. Illustrative light rays 22 and 24 from aperture 26 are passed by beam splitter plane 28 to optical lens system 20 and therefrom as collimated light rays 32 and 34, respectively, to work plane 14. Beam splitter 30 is a prism structure having a partially transparent beam splitter surface 28. One-half of the light entrant on beam splitter plane 28 is passed thereby and one-half is reflected away from photo-conductive cell array plane 38. On the return from work plane 14, again one-half of the light is lost. In this way, only one-quarter of the light originally exiting from aperture 26 is available as image light 40 on photo-conductive cell array plane 38.

Lens system 20 comprises two portions, a collimator lens portion 78 and achromatic lens portion 80 contiguous thereto. Lens system 20 is held within housing 62 by lens mount 82. Lens mount 82 has threaded portion 84 matching threaded portion 86 of housing 62. Lens system 20 is held within lens mount 82 by threaded washer 88. Threaded washer 88 holds lens system 20 against shoulder 90 by flexible washer 92. Light rays 32 and 34 returned from work plane 14 are focused on photo-conductive cell array plane 38 as light rays 23 and 25. Photo-conductive cell array 42 is fixedly mounted on array plane 38 in a conventional manner. Plane 38 is fixedly oriented with respect to housing 62 by array mount 94. Array mount 94 is fixedly associated with housing 62 by bolts 95. Array mount 94 includes washer 98, which holds array plane 38 therein, and electrically coupling portion 96, which provides the electrical connections for the cells of cell array 42. The image 40 of aperture 26 is focused on array plane 38.

The nature and function of cell array 42 and light sensitive bridge networks 52 and 54 will be understood through reference to FIGS. 4 and 5. In the null condition, work plane 14 is parallel to reference plane 12 and the vertical portion of light image 40 covers one-half of each photocell 44 and 46 and the horizontal portion thereof covers one-half of each photocell 48 and 50. In the Wheatstone bridge networks 52 and 54 shown in FIG. 4, the balance resistors are photo-conductive cells 106 and 108 and 110 and 112, respectively. Photo-conductive cells are selected as the bridge balance resistors so that there is automatic temperature compensation. There is temperature compensation because the balence cells and the light image covered cells are in the same temperature environment. The balance cells are disposed such that image 40 does not cover them. Preferably, they are masked.

Bridge networks 52 and 54 are essentially Wheatstone bridges. For bridge 52, the pitch voltage 56 will be zero if $R_{46}\times R_{106}=R_{44}\times R_{108}$, where R is the ohmic resistance and the subscript refers to the particular photo-conductive cell. Similarly, for bridge 54 the azimuth voltage 58 will be zero if $R_{48}\times R_{112}=R_{50}\times R_{110}$. The energizing voltage for bridge network 52 and 54 is direct voltage 118.

FIG. 5 presents curve 55 which is illustrative of the change of resistance versus light coverage characteristic of a photo-conductive cell suitable for the practice of this invention and provides actual experimental results. A commercially available lead-sulphide film is suitable for the photo-conductive cell. The ordinate 114 is the resistance of a representative cell 116 in units of $10^3$ ohms and the abscissa 117 is the coverage of the cell 116 by an illustrative light image 118 across the cell in units of 0.01 inches. The cell 116 size is one-half mm. by one mm. Its resistance in the absence of light is 200,000 ohms. It is seen that curve 55 has two linear portions 120 and 122. Thus, for a wide range of coverage of a cell by light image 40, the voltage output of the bridge network associated therewith is linearly representative of the particular angular orientation of work plane 14 which is involved.

The apparatus in accordance with this invention provides electrical information indicative of the pitch $\theta$ and azimuth $\phi$ of the work plane 14 relative to the reference plane 12. This electrical information can be used to automate the alignment of the work plane. Since the sensitivity of the bridge network 52 or 54 can be adjusted through conventional modification of its parameters, the size of the electro-optical apparatus 10 can be small commensurate with great sensitivity.

Through the use of two electro-optical structures in accordance with this invention, it is possible to determine electrically the roll of a work plane as well as its pitch and azimuth. In such a setup, the structures must be mounted on separate reference planes at an angular relationship with each other.

While the invention has been particularly shown and described with reference to a preferred embodiment thereof, it will be understood by those skilled in the art that various changes in form and details may be made therein without departing from the spirit and scope of the invention.

What is claimed is:

1. Apparatus for providing electrical detection of the pitch and azimuth of angular orientation of a work plane relative to a reference plane comprising, in combination: an optical section and an electrical section; said optical section having a light source, a collimating lens system, a mirror surface on said work plane, an aperture in the focal plane of said collimator lens system, a beam-splitter between said aperture and said collimator lens system whereby an image of said aperture is formed in a comparable focal plane defined by said beam-splitter and said collimator lens system; said electrical system having a light-sensitive bridge network for providing an electrical indication of said pitch and said azimuth; said bridge network comprising a first and second Wheatstone bridge, each of said Wheatstone bridges having first and second active photo-conductive cells located in said comparable focal plane and first and second temperature compensating photo-conductive cells, whereby variation in the position of said light image on said active photo-conductive cells of said bridge causes its voltage output to provide a temperature independent indication of the particular angular orientation involved.

2. The combination of claim 1 wherein said aperture is L-shaped to provide an L-shaped image, and the active photo-conductive cells of said bridges being disposed in and L-shaped pattern.

References Cited by the Examiner

UNITED STATES PATENTS

| | | | |
|---|---|---|---|
| 1,770,497 | 7/30 | Schroter | 250—210 X |
| 2,747,456 | 5/56 | Walker et al. | 88—14 |
| 2,774,961 | 12/56 | Orlando | 250—210 X |
| 2,777,069 | 1/57 | Saeman | 250—210 X |
| 2,870,671 | 1/59 | Falconi | 250—220 X |
| 2,952,779 | 9/60 | Talley | 250—203 X |
| 3,029,348 | 4/62 | Heinz | 250—203 X |
| 3,077,540 | 2/63 | Yager | 250—210 X |
| 3,084,261 | 4/63 | Wilson | 250—203 |
| 3,117,231 | 1/64 | Haynes | 250—203 |

References Cited by the Applicant

UNITED STATES PATENTS

| | | |
|---|---|---|
| 1,854,760 | 4/32 | Paulson. |
| 2,136,682 | 11/38 | Gilbert. |
| 2,588,974 | 3/52 | Fontain. |
| 2,696,565 | 12/54 | Schockley. |
| 2,712,722 | 7/55 | Trombe. |
| 2,775,158 | 12/56 | Mitchell. |

RALPH G. NILSON, *Primary Examiner.*

RICHARD M. WOOD, WALTER STOLWEIN, *Examiners.*